(12) United States Patent
Inglis et al.

(10) Patent No.: US 11,055,679 B2
(45) Date of Patent: Jul. 6, 2021

(54) BUNCH DOCUMENT RECYCLER

(71) Applicant: NCR Corporation, Duluth, GA (US)

(72) Inventors: David A. Inglis, Dundee (GB); Craig Scott Nicol, Perth (GB); Ken Peters, Dundee (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/133,581

(22) Filed: Apr. 20, 2016

(65) Prior Publication Data
US 2017/0308876 A1 Oct. 26, 2017

(51) Int. Cl.
*G06Q 20/10* (2012.01)
*G07F 19/00* (2006.01)
*G06Q 20/04* (2012.01)
*G06K 9/18* (2006.01)

(52) U.S. Cl.
CPC ......... *G06Q 20/1085* (2013.01); *G06K 9/186* (2013.01); *G06Q 20/042* (2013.01); *G07F 19/202* (2013.01)

(58) Field of Classification Search
CPC .... G06K 9/186; G07F 19/202; G06Q 20/042; G06Q 20/1085
See application file for complete search history.

(56) References Cited

U.S. PATENT DOCUMENTS

| | | | | |
|---|---|---|---|---|
| 6,331,000 B1 * | 12/2001 | Beskitt | .................... | B65H 29/06 271/178 |
| 2002/0036159 A1 * | 3/2002 | Graef | ..................... | B65H 3/00 209/534 |
| 2004/0247169 A1 * | 12/2004 | Ross | ..................... | G06K 9/6229 382/137 |
| 2005/0040225 A1 * | 2/2005 | Csulits | .................. | G07D 11/13 235/379 |
| 2005/0203846 A1 * | 9/2005 | Noguchi | .............. | G06Q 20/108 705/42 |
| 2006/0151595 A1 * | 7/2006 | Carpenter | ............ | G06Q 20/042 235/379 |
| 2008/0023539 A1 * | 1/2008 | Rao | ......................... | G07F 19/20 235/379 |
| 2008/0259314 A1 * | 10/2008 | Kamijo | .................... | G07D 7/12 356/51 |
| 2009/0324053 A1 * | 12/2009 | Ross | ..................... | G06K 9/2018 382/137 |
| 2010/0059417 A1 * | 3/2010 | Lee | ......................... | B65H 29/46 209/534 |
| 2011/0064279 A1 * | 3/2011 | Uno | ......................... | G07D 7/12 382/112 |
| 2013/0077136 A1 * | 3/2013 | Motoyama | ............... | H04N 1/04 358/498 |

(Continued)

*Primary Examiner* — Katrina R Fujita
(74) *Attorney, Agent, or Firm* — Schwegman, Lundberg & Woessner

(57) ABSTRACT

A method of processing a mixed bunch of banknotes and checks in a recycling self-service terminal is described. The method comprises: receiving a bunch of documents; recognizing each document from the received bunch; for each banknote recognized from the received bunch, validating the authenticity of that banknote; for each check recognized from the received bunch, extracting financial information from that check; and notifying a customer of the total value of the deposited bunch. A document validator, and a self-service terminal including the document validator, are also described.

19 Claims, 3 Drawing Sheets

(56) References Cited

U.S. PATENT DOCUMENTS

| | | | |
|---|---|---|---|
| 2014/0001105 A1* | 1/2014 | Petermann | G07D 11/50 209/534 |
| 2014/0034445 A1* | 2/2014 | Kallin | B65H 1/022 194/206 |
| 2014/0158496 A1* | 6/2014 | Angus | G07D 7/08 194/302 |
| 2014/0229002 A1* | 8/2014 | Graef | G07F 19/20 700/231 |
| 2014/0254911 A1* | 9/2014 | Carpenter | G06Q 40/02 382/137 |
| 2015/0279140 A1* | 10/2015 | He | G07D 7/00 194/320 |
| 2015/0348350 A1* | 12/2015 | Collins, Jr. | G07D 7/12 382/135 |
| 2016/0307388 A1* | 10/2016 | Williams | G06K 9/00442 |

* cited by examiner

BUNCH DOCUMENT RECYCLER

FIELD OF INVENTION

The present invention relates to document recycling. In particular, though not exclusively, the invention relates to automated handing of a mix of documents including currency and checks in a self-service terminal (SST).

BACKGROUND OF INVENTION

Some self-service terminals (SSTs), such as automated teller machines (ATMs), can receive banknotes deposited by a customer, and can store those banknotes for subsequent dispensing to a future customer. This is referred to as currency recycling.

Some ATMs allow customers to deposit checks that are credited to the customer's account.

SUMMARY OF INVENTION

Accordingly, the invention generally provides methods, systems, apparatus, and software for handling currency and checks in a currency recycler.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of processing a mixed bunch of banknotes and checks in a recycling self-service terminal, the method comprising the steps of: receiving a bunch of documents; recognizing each document from the received bunch; for each banknote recognized from the received bunch, validating the authenticity of that banknote; for each check recognized from the received bunch, extracting financial information from that check; and notifying a customer of the total value of the deposited bunch.

The method may comprise the further step of confirming that the customer wants to proceed with the deposit based on the total value notified to the customer.

The method may comprise the further step of returning all inserted documents to the customer in response to the customer cancelling the deposit transaction.

The method may comprise the further step of returning one or more inserted documents to the customer and storing the remainder of the inserted documents within the self-service terminal.

The method may comprise the further step of completing the transaction in response to the customer confirming that they want to proceed with the deposit.

The method may comprise the additional step of storing each validated banknote in a recycling cassette dedicated to the denomination of that validated banknote.

The method may comprise the additional step of storing each check in a dedicated check container.

The method may comprise the additional step of returning each check to the customer.

The step of recognizing each document from the received bunch may include recognizing a check by comparing one or more dimensions of the document being recognized with known dimensions of banknotes that can be validated by the terminal.

The step of recognizing each document from the received bunch may include recognizing a check by reading or recognizing a MICR codeline on a document.

The step of extracting financial information from a check may include extracting a MICR codeline and a courtesy amount.

The method may include the further step of confirming that a signature is present on a signature field of the check. The method may include confirming that a legal amount is present, or that the legal amount matches the courtesy amount.

The method may include the further step of presenting on a customer display an image of each check recognized by the terminal.

The method may include the further step of presenting on a customer display an image of each document that could not be recognized by the terminal and prompting the customer to decide whether the unrecognized documents should be stored by the terminal for manual processing or returned to the customer. Any unrecognized documents retained for manual processing may be stored in a different part of the terminal to stored checks.

According to a second aspect there is provided a media item recycler operable to receive and dispense banknotes and to receive checks, the recycler comprising: an interface for receiving a bunch of media items; an item stripping unit operable to extract individual media items from a bunch of media items presented to the interface; a media item validator operable to: (i) distinguish between checks and currency, (ii) validate currency, and (iii) capture an image of each check; and a recycling cassette operable to receive currency received from one customer and to dispense that currency to a subsequent customer.

The media item interface may comprise a pocket interface. The pocket interface may include a separating plate defining a first area in which media items are inserted by a customer, and a second area from which returned media items can be removed by the customer.

Alternatively, the media item interface may comprise a slot interface. The slot may receive media items short edge first, or alternatively long edge first.

The item stripping unit may comprise belts. In other embodiments the item stripping unit comprises rollers, or a combination of belts, rollers, skid plates, and the like.

The media item validator may be operable to capture an image of each of a front and rear side of each media item. The media item validator may store a file containing the captured images for access by a driver in a self-service terminal into which the media item recycler is integrated. The driver may provide information extracted from the images to an application executing on the self-service terminal.

The media item validator may be operable to distinguish between checks and currency by comparing a dimension of a received media item with known sizes of banknotes accepted by the media item recycler.

The media item validator may be operable to distinguish between checks and currency by detecting a MICR codeline on a document. A MICR codeline may be detected using a MICR reader, a basic magnetic sensor, or optical character recognition performed on an image of the document.

The media item recycler may further comprise a MICR reader.

The media item recycler may further comprise a centralization device operable to centralize a validated banknote prior to storing the validated banknote in the recycler cassette.

According to a third aspect there is provided a self-service terminal comprising: a document validator operable to process banknotes and checks; and a recycling cassette operable to receive a deposited banknote from the document validator and to dispense the deposited banknote to a subsequent customer.

The terminal may include a dedicated check store.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
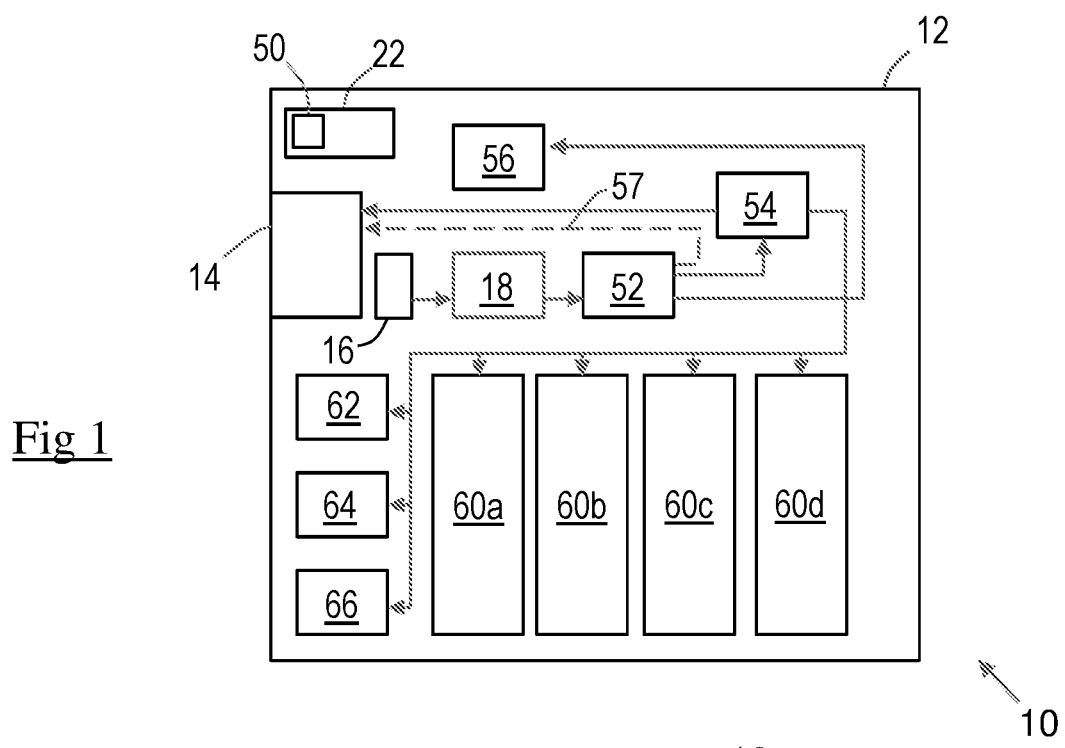
FIG. 1 is a simplified schematic diagram of a bunch document recycler according to one embodiment of the present invention.

Reference is first made to FIG. 1, which is a simplified schematic diagram of a bunch document recycler 10 according to one embodiment of the present invention. The recycler 10 is operable to receive bunches of banknotes (or an individual banknote) from a customer and to dispense bunches of banknotes (or an individual banknote) to a customer. The recycler 10 is also operable to receive an individual check, a bunch of checks, or a mixed bunch of banknotes and checks, and to process the bunch (either a mixed bunch or a bunch of just checks) in a single transaction.

The recycler 10 includes a chassis 12 onto which various parts are mounted. The recycler 10 further comprises: a document interface 14 in the form of a bunch slot configured to receive documents short edge first. The document interface 14 is used for receiving documents from a customer and also for returning (or dispensing) documents to a customer. Thus, the document interface is a bi-directional interface (customer to recycler and recycler to customer). Although this embodiment is configured for receiving documents short edge first, in other embodiments, the recycler may be configured to receive documents long edge first.

The recycler 10 also comprises an item stripping unit 16 operable to remove documents one at a time from the bunch of documents inserted by a customer into the document interface 14. Item stripping units (also known as note picking units) are known, and may include rollers, belts, or the like. In embodiments where the document interface 14 comprises a pocket interface, the item stripping unit 16 may be incorporated into the pocket interface.

The item stripping unit 16 may also bunch documents that are delivered to it, for example, returned documents from the escrow 54 or dispensed banknotes from one of more of the currency cassettes 60a to 60d (which may not pass through the escrow 54, depending on how the recycler 10 is configured).

The item stripping unit 16 feeds documents (which may be either checks or banknotes) one at a time to a document validator 18.

Figure 2:
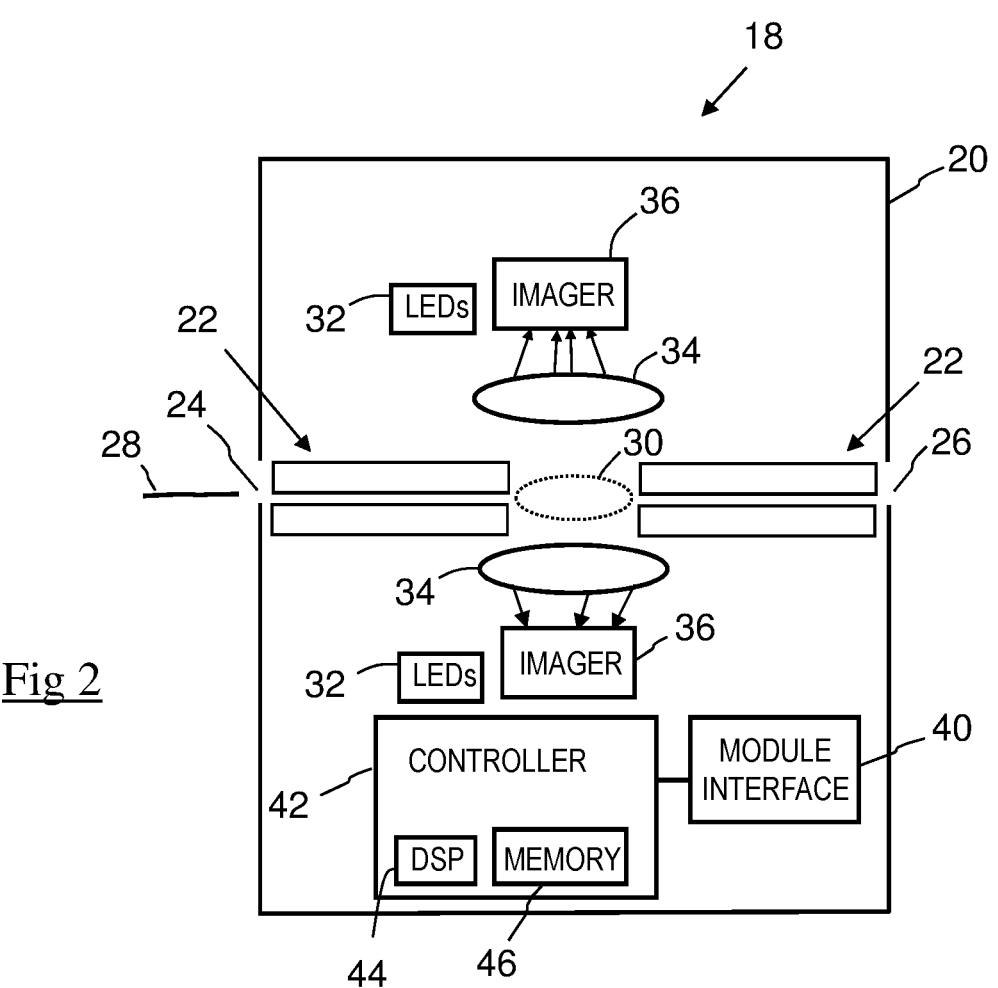
FIG. 2 is a simplified schematic diagram of a document validator mounted in the recycler of FIG. 1.

The document validator 18 is shown in more detail in FIG. 2, and comprises a housing 20 supporting a transport mechanism 22 in the form a train of pinch rollers comprising upper pinch rollers aligned with lower pinch rollers, extending from an entrance port 24 on the item stripping unit side of the validator 18 to a capture port 26 on the opposite side. In other embodiments, the transport mechanism may use belts, skid plates, or the like.

The entrance and capture ports 24,26 are in the form of apertures defined by the housing 20.

The transport mechanism 22 guides a document (which may be a banknote or a check) 28 short edge first through an examination area 30. While the document 28 is being conveyed through the examination area 30, the document 28 is illuminated selectively by illumination sources 32, such as LEDs. These LEDs are selected to provide information used to validate the authenticity of banknotes, and may include infra-red LEDs, UV LEDs, and other types of LEDs (for example, red light, blue light, and green light LEDs).

The document validator 18 includes a pair of optical lenses 34 on opposing sides of the document 28 that focus light from the document 28 to respective optical imagers 36. In some embodiments, the optical lenses 34 may be integrated into the imagers 36, or the imagers 36 may not require any lenses.

The document validator 18 also includes a data and power interface 40 for allowing the document validator 18 to transfer data to an external unit, such as an ATM (shown in FIG. 3) in which the recycler 10 is mounted (or to a controller 22 (FIG. 1) in the recycler 10), and to receive data, commands, and power therefrom.

The document validator 18 also has a controller 42 including a digital signal processor (DSP) 44 and an associated memory 46. The controller 42 controls the transport mechanism 22, the LEDs 32, and the optical imagers 36. The controller 42 also collates and processes data captured by the optical imagers 66, and communicates this data and/or results of any analysis of this data to an external unit via the data and power interface 40. In particular, in this embodiment, the front and rear side images of each document are saved as images within one or more files.

Returning to FIG. 1, the recycler controller 22 controls the operations of the recycler 10 and includes an interface 50 (in the form of a USB connection) to a self-service terminal (not shown) in which the recycler 10 is mounted.

The recycler 10 further comprises: a diverter 52 operable to route a document from the document validator 18 to either an escrow 54 or to a capture bin 56. Document diverters are well known to those of skill in the art. The diverter 52 may be as simple as a solenoid operated skid plate or it may comprise a rotary arrangement with multiple input and output pathways, such as the diverter described in U.S. Pat. No. 8,875,991 assigned to NCR Corporation.

The capture bin 56 is typically used to store counterfeit banknotes, particularly where this is mandated by law (for example, by the rules of the European Central Bank). In some embodiments, the diverter 52 may be operable to return a document directly to the customer via the document interface 14, shown by broken line 57 in FIG. 1.

The escrow 54 is operable to receive individual documents from the document validator 18 and to collate these individual documents into a bunch of documents, with the order of documents in the bunch matching the order in which the documents were received from the document validator 18. The escrow 54 can then return the bunch of documents to the customer via the document interface 14 or convey the documents individually to document storage containers in the recycler 10. In this embodiment, a drum escrow is used, so the documents are returned from the escrow 54 in the reverse order to the order in which they were loaded; whereas, if a stacking escrow was used, the order the documents are returned in could be either the same order or the reverse order.

There are a number of different types of document storage containers in the recycler 10. For example, the recycler 10 includes four recycling cassettes 60a to 60d, each recycling cassette 60 being dedicated to a single denomination of banknote. The recycler 10 also includes a currency reject bin 62 for storing any banknotes which are not suitable for returning to a customer. In this embodiment, the recycler 10 includes a currency retract bin 64 that holds banknotes that were picked from a recycling cassette as part of a dispense operation but could not be used (for example, because multiple notes were inadvertently picked in one operation) and any banknotes that were presented to a customer but not removed from the document interface 14 by the customer. The recycler 10 also includes a check bin 66 for storing checks deposited in the recycler 10 by a customer. In other embodiments, however, checks may be returned to the customer rather than stored in the recycler 10, or checks may be stored in one of the other bins (for example, the capture bin 56, the currency reject bin 62, or the currency retract bin 64). In some embodiments, such as those where a high ratio of checks to currency is received, checks may be stored in one or more of the recycling cassettes 60a to 60d.

The recycler 10 may include a centralization device (not shown) between the escrow 54 and the recycling cassettes 60 to ensure that each banknote is loaded into a recycling cassette in a manner that ensures efficient and accurate removal therefrom in a subsequent dispense operation.

Figure 3:
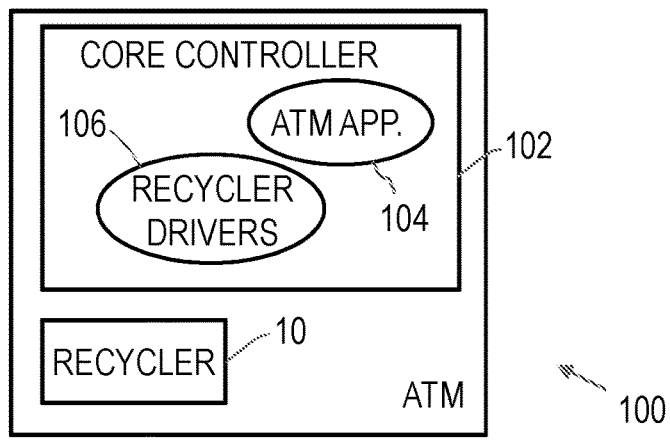
FIG. 3 is a simplified schematic diagram of a self-service terminal including the recycler of FIG. 1.

Reference is now made to FIG. 3, which is a simplified schematic diagram of a self-service terminal 100 in which the recycler 10 is mounted. In this embodiment, the self-service terminal 100 is an automated teller machine (ATM), but in other embodiments different types of SST may be provided (such as a self-checkout out terminal for a retail establishment).

The ATM 100 is shown in greatly simplified form to highlight some relevant components. The ATM 100 includes a core controller 102 in which various software components execute. One such component is an ATM application 104 that is operable to control the operation of the ATM 100 and to provide a sequence of screens to the customer to guide the customer through a transaction.

The ATM 100 also includes various drivers to control devices therein. These drivers also execute in the core controller 102. One of the drivers is a recycler driver 106. This recycler driver 106 sends commands to the recycler 10 (in particular to the controller 22 via the USB interface 50) and receives notifications from the controller 22. The recycler driver 106 also stores and accesses files (such as image files) for the recycler 10.

The operation of the recycler 10 during a deposit transaction will now be described with reference to FIG. 4, which is a flowchart 110 illustrating the operation of the recycler 10 in processing documents from a mixed bunch of banknotes and checks.

Figure 4:
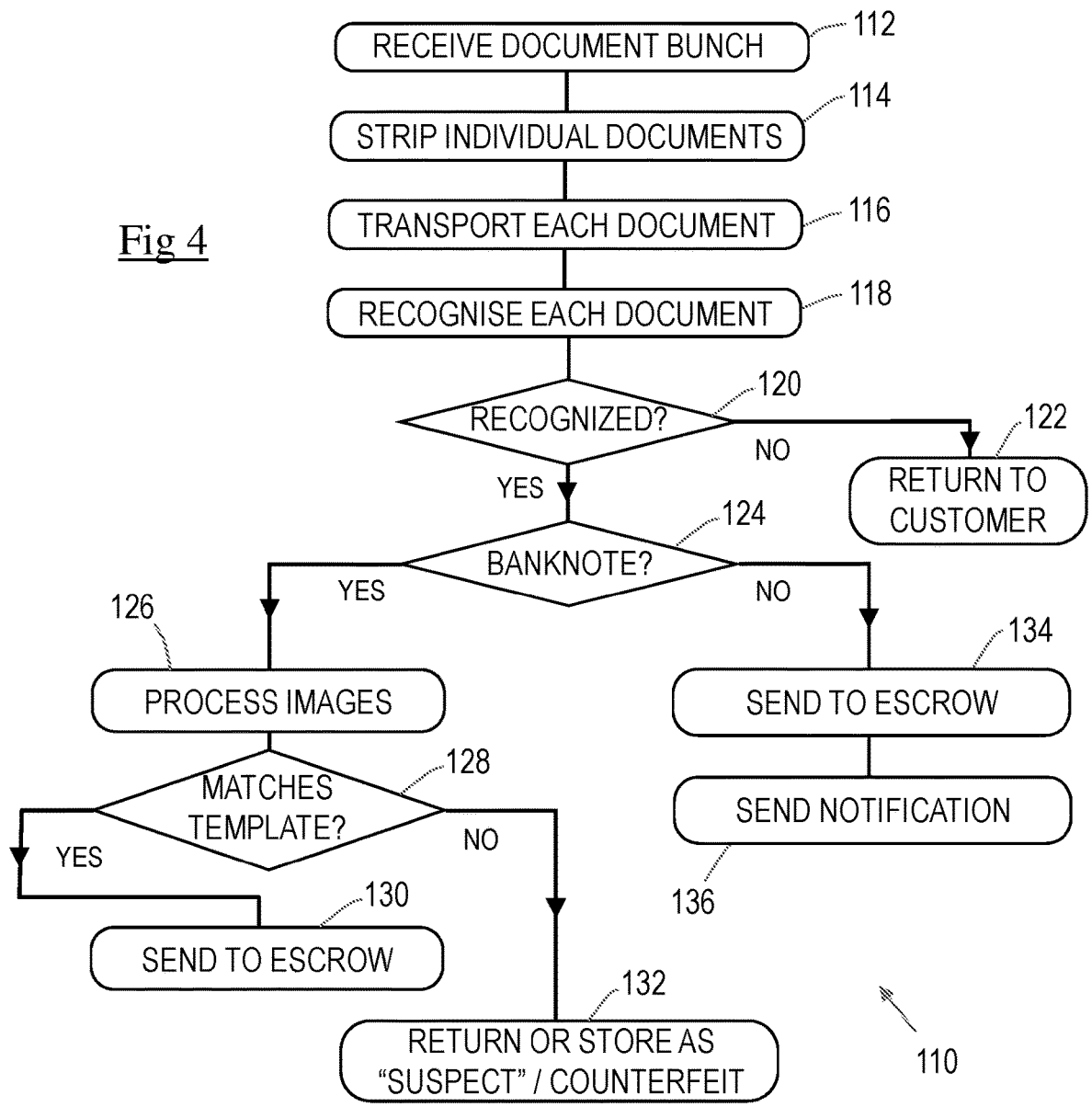
FIG. 4 is a flowchart illustrating the operation of the recycler of FIG. 1.

When a customer inserts a bunch of documents, these documents are received by the document interface 14 (step 112 in FIG. 4). The item stripping unit 16 then removes documents one at a time from the bunch of documents inserted by the customer into the document interface 14 (step 114).

The item stripping unit 16 feeds documents (which may be either checks or banknotes) one at a time to the document validator 18 (step 116), which attempts to recognize each document it receives (step 118) and categorize it as either a banknote, a check, or unrecognized (neither a banknote nor a check) (step 120), and then processes it accordingly, as will now be described in more detail. This recognition step involves the document validator 18 comparing the received document with properties of checks and banknotes that the recycler 10 is operable to process.

Checks may be recognized by detecting a MICR codeline. This may be implemented by using OCR on one of the images to detect a line of numbers. In other embodiments, checks may be recognized by comparing a dimension of the document being recognized with a known dimension of a banknote (or the largest or smallest banknote) that can be validated by the document validator 18. In other embodiments, a check may be recognized by detecting fields that are typically provided on checks, for example, a courtesy amount field, a signature field, a date field, and the like.

If the document is not recognized (step 120) then it is returned to the customer (step 122) via the document interface 14. A document may not be recognized because it may not be a check or banknote, it may be a slip of paper inadvertently included in a bunch of checks and banknotes.

If the document is recognized as a particular denomination of a banknote (step 124) then the document validator 18 validates that banknote to ascertain if it is genuine. Banknote validation is known and so will only be described at a high level herein. Once a banknote is recognized, the captured images for that banknote, and/or data extracted from that banknote by sensors within the document validator 18, are processed (step 126) and the results are compared with additional features of a template for that banknote (step 128) and if there is a match then the banknote is accepted as valid and transported to the escrow by the diverter 52 (step 130). If there is no match then the banknote is treated as either a counterfeit or suspect and the diverter 52 either returns the banknote to the customer or sends it to the capture bin 56 for storage (step 132), depending on the rules used to configure the recycler 10. For example, ECB6 rules require a recycler or depository to store any suspect or counterfeit banknotes that have been deposited.

If the document is recognized as a check at step 124, then the document validator 18 sends the check to the escrow 54 (step 134). The document validator then sends a notification to the recycler driver 106 in the ATM 100 (step 136).

Figure 5:
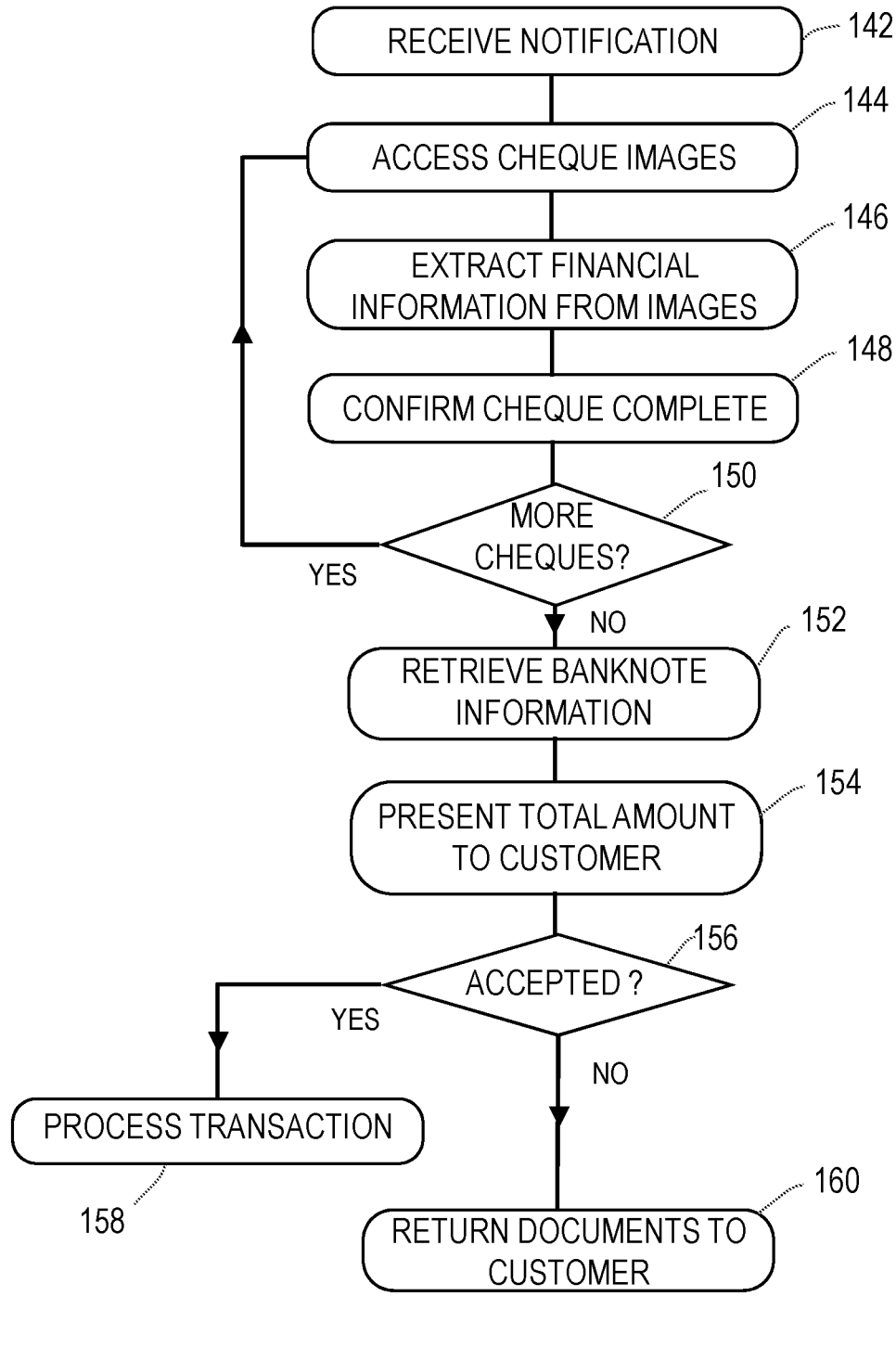
FIG. 5 is a flowchart illustrating the operation of terminal of FIG. 3 when the recycler is operating.

Reference will now be made to FIG. 5, which is a flowchart 140 illustrating the operation of ATM 100 (in particular the ATM application 104 and the recycler driver 106) when the recycler 10 is processing documents.

The recycler driver 106 receives the notification sent by the document validator in step 134 of FIG. 4 (step 142).

The ATM application 104 then accesses the images for that check and the MICR code line read by the validator and stored with the images (step 144). Using OCR techniques, the ATM application 104 extracts all relevant financial information from the check (step 146). This financial information includes the legal amount. The ATM application 104 also confirms that all necessary fields on the check have been completed (step 148). This may include checking for the presence of a signature in a signature field on the check, checking for a date in a date field on the check, and checking that the check has been endorsed on a rear surface of the check by the customer.

If the check is not complete then it may be returned to the customer without any further processing. Optionally, the customer may be provided with information about the incomplete or incorrect field. Alternatively, if the deficiency could be rectified by manual processing, then the customer may be prompted by the ATM 100 to decide if the check should be stored for subsequent manual processing or returned to the customer, or the customer may be prompted to supply missing information (for example, the amount the check is made out for).

If the check is complete, then the ATM application 104 ascertains if there are more checks to be processed in the current deposit transaction (step 150).

If there are more checks to be processed, then the ATM application 104 repeats steps 144 through 148 for each additional check.

Once all checks have been processed (or in some embodiments while the checks are being processed), the ATM application 104 retrieves the banknote information from the recycler 10 (in particular, from the recycler driver 106) (step 152). This banknote information includes details of the number of banknotes deposited, the total value of the banknotes, and whether any were rejected.

The ATM application 104 then presents the total deposit value to the customer on a display (not shown) of the ATM 100 (step 154) and then requests the customer to either accept or decline the transaction (step 156). The step of presenting the total deposit value may include presenting to the customer a front image of each check deposited by the customer. Where multiple checks are deposited, the step may include allowing the user to select each check image individually so that details of the check image can be read on the customer display by the customer.

If the customer accepts the transaction then the ATM application 104 instructs the recycler 10 to store the deposited banknotes and checks in the appropriate cassettes 60 and bins in the recycler 10 (step 158). In some embodiments the checks may be returned to the customer. In other embodiments, a printer may be included in the recycler 10 to endorse the checks and/or to overprint the checks as void or presented.

If the customer declines the transaction then the ATM application 104 instructs the recycler 10 to return all deposited documents (checks and banknotes) to the customer via the document interface 14 (step 160).

The customer may be allowed to accept part of a transaction. For example, the customer may be allowed to accept the banknote deposit but cancel the check deposit portion. As another example, the customer may be allowed to proceed with depositing some checks but cancel other checks. In some embodiments, the recycler 10 may implement check cashing and may charge a transaction fee for cashing a check presented by the customer.

The ATM 100 is then ready to perform the next transaction, which may be a deposit transaction or a dispense transaction.

It will now be appreciated that this embodiment has the advantage that a customer can deposit a mixed bunch of banknotes and checks for depositing in a single transaction, and the recycler 10 can process these documents in a single transaction.

Various modifications may be made to the above described embodiment within the scope of the invention, for example, in other embodiments the document interface 14 may comprise a pocket interface rather than a slot interface, or the slot interface may be configured to receive documents long edge first. The pocket interface may include a separating plate defining a first area in which media items are inserted, and a second area from which returned media items can be removed by the customer. In other embodiments, the item stripping unit may comprise rollers, or a combination of belts, rollers, skid plates, and the like.

Although not described herein, the document validator 18 may also categorize each document according to other parameters, for example, if the banknote is a counterfeit, or a suspect banknote (that is, not categorically a counterfeit but not clearly genuine), or based on the fitness of the banknote for recirculation (absence of tears, folds, staining, or the like).

Different designs of document validator may be used, with different illumination sources and different optical and transport arrangements.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A method of processing a mixed bunch of banknotes and checks in a recycling self-service terminal, the method comprising the steps of:

receiving a bunch of documents with long edges of the documents inserted first within a first area of an interface of the recycling self-service terminal;

recognizing, by a processor, each document from the received bunch by performing image processing and identifying with each document whether that document is: a check, a banknote, or an unrecognized document based on the image processing, wherein recognizing further includes at least identifying the banknote from the check based on dimensions of each document and known dimensions associated with recognized banknotes, and wherein recognizing further includes identifying the check from the banknote based on known fields associated with recognized checks;

for each banknote recognized from the received bunch, validating the authenticity of that banknote by selectively illuminating each side of each document through illumination sources including: Infrared (IR) light source, Light Emitting Diode (LED) light source, and Ultraviolet (UV) light source and processing, by the processor, images captured from the illumination sources for validating the authenticity of that banknote;

for each check recognized from the received bunch, extracting, by the processor, financial information from that check;

interacting, by the processor, with a customer and receiving inputs from the customer correcting any incomplete or incorrect fields identified in some of the checks;

causing, by the processor, any unrecognized documents to be returned from the recycling self-service terminal to the customer through a second area of the interface of the recycling self-service terminal based on a first selection made by the customer indicating that the unrecognized documents are to be returned to the customer, causing, by the processor, the unrecognized documents to be stored for subsequent manual processing based on a second selection made by the customer, and causing, by the processing, all checks identified recognized and unrecognized to be returned to the customer based on a third selection made by the customer;

notifying, by the processor, the customer of the total value of the deposited bunch;

storing, by the processor, validated banknotes in recycling cassettes selected based on denominations of the banknotes; and storing, by the processor, at least one check in a particular one of the recycling cassettes when a ratio of stored checks to stored banknotes exceeds a threshold.

2. A method according to claim 1, wherein the method comprises the further step of confirming that the customer wants to proceed with the deposit based on the total value notified to the customer.

3. A method according to claim 2, wherein the method comprises the further step of completing the transaction in response to the customer confirming that they want to proceed with the deposit.

4. A method according to claim 3, wherein the method comprises the additional step of storing each check in a dedicated check container.

5. A method according to claim 3, wherein the method comprises the additional step of returning each check to the customer.

6. A method according to claim 1, wherein the step of recognizing each document from the received bunch includes recognizing a check by detecting a MICR codeline on the document or detecting fields typically provided on a check.

7. A method according to claim 1, wherein the step of extracting financial information from a check includes extracting a MICR codeline and a courtesy amount.

8. A method according to claim 7, wherein the method includes the further step of confirming that a signature is present on a signature field of the check.

9. A method according to claim 1, wherein the method includes the further step of presenting on a customer display an image of each check recognized by the terminal.

10. A media item recycler configured to receive and dispense banknotes and to receive checks, the recycler comprising:

a media item interface for receiving a bunch of media items, wherein the media interface includes a first area to receive long edges of the media items first and a second area for dispensing returned media items;

an item stripping unit configured to extract individual media items from a bunch of media items presented to the media item interface;

a processor that executes instructions representing a media item validator configured to: (i) distinguish between checks, currency, and unrecognized documents through processing images of the media items, wherein distinguishing between the checks and the currency is at least based on dimensions of the media item, known dimensions associated with recognized currency, and known fields associated with recognized checks, (ii) validate currency by selectively illumination of each side of the currency through illumination sources including: Infrared (IR) light source, Light Emitting Diode (LED) light source, and Ultraviolet (UV) light source and process currency images captured from the illumination sources validating the authenticity of that currency, (iii) capture an image of each check; (iv) interact with a customer and receive inputs from the customer correcting any incomplete or incorrect fields identified in some of the checks, and (v) cause any unrecognized documents to be returned to the customer through the second area of the media interface based on a first selection made by the customer indicating that the unrecognized documents are to be returned to the customer, and cause the unrecognized documents to be stored for subsequent manual processing based on a second selection made by the customer, and cause all checks to be returned to the customer based on a third selection made by the customer;

recycling cassettes configured to receive currency received from the customer and to dispense that currency to a subsequent customer based on currency denominations; and at least one of the recycling cassettes to receive at least one check in the at least one of the recycling cassettes when a ratio of stored checks to stored banknotes exceeds a threshold.

11. A media item recycler according to claim 10, wherein the media item interface comprises a pocket interface.

12. A media item recycler according to claim 10, wherein the media item interface comprises a slot interface.

13. A media item recycler according to claim 10, wherein the item stripping unit comprises endless belts.

14. A media item recycler according to claim 10, wherein the media item validator is configured to capture an image of each of a front and rear side of each media item.

15. A media item recycler according to claim 10, wherein the media item validator is configured to distinguish between checks and currency by detecting a MICR codeline on the media item or by detecting fields typically provided on a check.

16. A media item recycler according to claim 10, further comprising a MICR reader.

17. A media item recycler according to claim 10, wherein the media item recycler further comprises a centralization device configured to centralize a validated banknote prior to storing the validated banknote in a particular one of the recycler cassettes.

18. A self-service terminal comprising:

a processor that executes instructions representing a document validator configured to process banknotes and checks; and recycling cassettes configured to receive a deposited banknote from the document validator initiated by a customer and to dispense the deposited banknote to a subsequent customer;

wherein the document validator includes illumination sources including: Infrared (IR) light source, Light Emitting Diode (LED) light source, and Ultraviolet (UV) light source, each illumination source includes a pair of light sources situated to illuminate each side of each banknote, and the document validator configured to:

(i) process images captured from the illumination sources, (ii) validate the authenticity of each banknote, (iii) validate each check, wherein each banknote is distinguished from each check based on dimensions of a given document and known dimensions associated with recognized banknotes and based on known fields associated with recognized checks, (iv) interact with customer and receive inputs from the customer to correct any incomplete or incorrect fields identified in some of the checks, (v) cause any unrecognized documents to be returned from the self-service terminal to the customer based on a first selection made by the customer indicating that the unrecognized documents are to be returned to the customer, and cause the unrecognized documents to be stored for subsequent manual processing based on a second selection made by the customer, and cause all checks to be returned to the customer based on a third selection made by the customer, wherein returned checks are returned through a first area of a media interface for the self-service terminal and wherein a second area of the media interface adapted to receive the banknotes and the checks with long edges inserted first into the second area for processing within the self-service terminal, (vi) store validated banknotes in recycling cassettes selected based on denominations of the banknotes, and (vii) store at least one check in a particular one of the recycling cassettes when a ratio of stored checks to stored banknotes exceeds a threshold.

19. A self-service terminal according to claim 18, wherein the terminal includes a dedicated check store.

* * * * *